(12) United States Patent
Seguin et al.

(10) Patent No.: US 7,022,158 B2
(45) Date of Patent: Apr. 4, 2006

(54) ADSORPTION ELEMENT AND METHODS

(75) Inventors: Kevin John Seguin, Champlin, MN (US); Steven Alan Carter, Eagan, MN (US); Andrew James Dallas, Apple Valley, MN (US); Lefei Ding, St. Paul, MN (US); Brian Nghia Hoang, Shakopee, MN (US); Jon Dennis Joriman, Little Canada, MN (US)

(73) Assignee: Donaldson Company, Inc., Bloomington, MN (US)

( * ) Notice: Subject to any disclaimer, the term of this patent is extended or adjusted under 35 U.S.C. 154(b) by 50 days.

(21) Appl. No.: 10/705,753

(22) Filed: Nov. 10, 2003

(65) Prior Publication Data

US 2005/0005769 A1   Jan. 13, 2005

Related U.S. Application Data

(63) Continuation of application No. 10/165,085, filed on Jun. 7, 2002, now Pat. No. 6,645,271.

(60) Provisional application No. 60/297,185, filed on Jun. 8, 2001.

(51) Int. Cl.
*B01D 53/04*   (2006.01)

(52) U.S. Cl. ............................ 95/90; 95/143; 95/146; 96/134; 96/144; 96/147; 96/154; 55/385.1; 55/524

(58) Field of Classification Search .............. 95/90, 95/143, 146; 96/108, 130, 134–136, 142, 96/147, 151, 153, 154, 144; 55/524, DIG. 5, 55/385.3, 385.1
See application file for complete search history.

(56) References Cited

U.S. PATENT DOCUMENTS

| | | |
|---|---|---|
| 2,038,071 A | 4/1936 | Wilhelm |
| 2,907,075 A | 10/1959 | Newby |
| 3,094,492 A | 6/1963 | Miller et al. |
| 3,454,502 A | 7/1969 | Hiltgen et al. |
| 3,664,095 A | 5/1972 | Asker et al. |
| 3,721,072 A | 3/1973 | Clapham |
| 3,813,347 A | 5/1974 | Hayes |
| 3,965,695 A | 6/1976 | Rush et al. |
| 4,051,098 A | 9/1977 | Takemura et al. |
| 4,155,123 A | 5/1979 | Popper |
| 4,510,193 A | 4/1985 | Blucher et al. |
| 4,517,308 A | 5/1985 | Ehlenz et al. |
| 4,665,050 A | 5/1987 | Degen et al. |
| 4,678,771 A | 7/1987 | Beitinger et al. |
| 4,843,739 A | 7/1989 | von Blücher et al. |
| 4,954,465 A | 9/1990 | Kawashima et al. |
| 5,009,308 A | 4/1991 | Cullen et al. |
| 5,033,465 A | 7/1991 | Braun et al. |
| 5,098,621 A | 3/1992 | Hermann |
| 5,148,337 A | 9/1992 | Cullen et al. |
| 5,154,960 A | 10/1992 | Mucci et al. |

(Continued)

FOREIGN PATENT DOCUMENTS

DE    19814123    10/1999

(Continued)

*Primary Examiner*—Robert H. Spitzer
(74) *Attorney, Agent, or Firm*—Merchant & Gould P.C.

(57) ABSTRACT

An adsorbent article having a base body or matrix onto which is applied an adsorptive coating. The body or matrix can be a honeycomb matrix or structure having a plurality of cells defining a plurality of passages extending through the body. The adsorptive coating comprises an adsorptive media, such as activated carbon or ion exchange resin, that is bound by a polymeric adhesive or resin. The adsorbent article has a minimal pressure loss therethrough.

16 Claims, 11 Drawing Sheets

U.S. PATENT DOCUMENTS

| | | |
|---|---|---|
| 5,155,146 A | 10/1992 | Reetz |
| 5,182,140 A | 1/1993 | Watanabe et al. |
| 5,212,131 A | 5/1993 | Belding |
| 5,261,169 A | 11/1993 | Williford |
| 5,288,299 A | 2/1994 | Yoshida et al. |
| 5,350,443 A | 9/1994 | von Blücher et al. |
| 5,352,274 A | 10/1994 | Blakley |
| 5,356,278 A | 10/1994 | Reetz |
| 5,372,303 A | 12/1994 | Paul |
| 5,422,138 A | 6/1995 | Watanabe et al. |
| 5,435,958 A | 7/1995 | Dinnage et al. |
| 5,480,621 A | 1/1996 | Breuer et al. |
| 5,505,769 A | 4/1996 | Dinnage et al. |
| 5,540,916 A | 7/1996 | Parks |
| 5,542,968 A | 8/1996 | Belding et al. |
| 5,556,030 A | 9/1996 | Paul |
| 5,558,714 A | 9/1996 | Watanabe et al. |
| 5,574,821 A | 11/1996 | Babasade |
| 5,593,482 A | 1/1997 | Dauber et al. |
| 5,599,445 A | 2/1997 | Betz et al. |
| 5,607,580 A | 3/1997 | Betz et al. |
| 5,609,756 A | 3/1997 | Betz et al. |
| 5,611,486 A | 3/1997 | Paul |
| 5,620,603 A | 4/1997 | Betz et al. |
| 5,630,937 A | 5/1997 | Betz et al. |
| 5,636,628 A | 6/1997 | Barnum |
| 5,653,875 A | 8/1997 | Betz et al. |
| 5,660,048 A | 8/1997 | Belding et al. |
| 5,683,532 A | 11/1997 | Kuma |
| 5,693,385 A | 12/1997 | Parks |
| 5,702,780 A | 12/1997 | Tiller et al. |
| 5,707,922 A | 1/1998 | Mimori et al. |
| 5,753,357 A | 5/1998 | Filipitsch et al. |
| 5,758,508 A | 6/1998 | Belding et al. |
| 5,763,335 A | 6/1998 | Hermann |
| 5,766,290 A | 6/1998 | Zievers et al. |
| 5,792,244 A | 8/1998 | Morlec et al. |
| 5,817,168 A | 10/1998 | Wheless |
| 5,824,246 A | 10/1998 | Reetz |
| 5,860,284 A | 1/1999 | Goland et al. |
| 5,890,372 A | 4/1999 | Belding et al. |
| 5,891,508 A | 4/1999 | Barnum |
| 5,924,221 A | 7/1999 | Schuver et al. |
| 5,958,098 A | 9/1999 | Heung |
| 6,025,287 A | 2/2000 | Hermann |
| 6,083,857 A | 7/2000 | Böttger et al. |
| 6,117,218 A | 9/2000 | Snyder et al. |
| 6,120,584 A | 9/2000 | Sakata et al. |
| 6,146,451 A | 11/2000 | Sakata et al. |
| 6,165,252 A | 12/2000 | Kendall |
| 6,228,506 B1 | 5/2001 | Hosatte et al. |
| 6,231,644 B1 | 5/2001 | Jain et al. |
| 6,331,351 B1 | 12/2001 | Waters et al. |
| 6,352,578 B1 | 3/2002 | Sakata et al. |
| RE37,779 E | 7/2002 | Kuma et al. |
| 6,413,303 B1 | 7/2002 | Gelderland et al. |
| 6,468,428 B1 | 10/2002 | Nishii et al. |
| 6,645,271 B1 * | 11/2003 | Seguin et al. .................. 95/90 |
| 2001/0029843 A1 | 10/2001 | Minoru et al. |

FOREIGN PATENT DOCUMENTS

| | | |
|---|---|---|
| GB | 2050194 | 1/1981 |
| GB | 2198053 | 6/1988 |
| NL | 1001804 | 6/1997 |

* cited by examiner

ADSORPTION ELEMENT AND METHODS

This application is a CON of Ser. No. 10/165,085, filed on Jun. 7, 2002 now U.S. Pat. No. 6,645,271.

Priority under 35 U.S.C. § 119(e) is claimed to provisional application Ser. No. 60/297,185, filed on Jun. 8, 2001, and entitled "Adsorption Element and Methods". The complete disclosure of application 60/297,185 is incorporated by reference herein.

FIELD

The present invention relates to an adsorption element for removing contaminants from a gaseous stream, such as an air stream.

BACKGROUND

Gas adsorption articles or elements are used in many industries to remove airborne contaminants to protect people, the environment, and often, a critical manufacturing process or the products that are manufactured by the process. A specific example of an application for gas adsorption articles is the semiconductor industry where products are manufactured in an ultra-clean environment, commonly known in the industry as a "clean room". Gas adsorption articles are also used in many non-industrial applications. For example, gas adsorption articles are often present in air movement systems in both commercial and residential buildings, for providing the inhabitants with cleaner breathing air.

Typical airborne contaminants include basic contaminants, such as ammonia, organic amines, and N-methyl-2-pyrrolidone, acidic contaminants, such as hydrogen sulfide, hydrogen chloride, or sulfur dioxide, and general organic material contaminants, often referred to as VOCs (volatile organic compounds) such as reactive monomer or unreactive solvent. Silica containing reactive and unreactive materials, such as silanes, siloxanes, silanols, and silazanes can be particularly detrimental contaminants for some applications. Additionally, may toxic industrial chemicals and chemical warfare agents must be removed from breathing air.

The dirty or contaminated air is often drawn through a granular adsorption bed assembly or a packed bed assembly. Such beds have a frame and an adsorption medium, such as activated carbon, retained within the frame. The adsorption medium adsorbs or chemically reacts with the gaseous contaminants from the airflow and allows clean air to be returned to the environment. The removal efficiency is critical in order to adequately protect the processes and the products.

The removal efficiency and capacity of the gaseous adsorption bed is dependent upon a number of factors, such as the air velocity through the adsorption bed, the depth of the bed, the type and amount of the adsorption medium being used, and the activity level and rate of adsorption of the adsorption medium. It is also important that for the efficiency to be increased or maximized, any air leaking through voids between the tightly packed adsorption bed granules and the frame should be reduced to the point of being eliminated. Examples of granular adsorption beds include those taught is U.S. Pat. No. 5,290,245 (Osendorf et al.), U.S. Pat. No. 5,964,927 (Graham et al.) and U.S. Pat. No. 6,113,674 (Graham et al.). These tightly packed adsorption beds result in a torturous path for air flowing through the bed.

However, as a result of the tightly packed beds, a significant pressure loss is incurred. Current solutions for minimizing pressure loss include decreasing air velocity through the bed by increased bed area. This can be done by an increase in bed size, forming the beds into V's, or pleating. Unfortunately, these methods do not adequately address the pressure loss issue, however, and can create an additional problem of non-uniform flow velocities exiting the bed.

Although the above identified adsorption beds are sufficient in some applications, what is needed is an alternate to a bed that can effectively remove contaminants such as acids, bases, or other organic materials, while minimizing pressure loss and providing uniform flow velocities exiting the filter.

SUMMARY OF THE INVENTION

The present invention is directed to an adsorptive element having a minimal pressure loss therethrough. The adsorptive element has a base body substrate, or matrix, onto which is applied an adsorptive coating. The body can be a honeycomb matrix or other structure having a plurality of cells defining a plurality of passages extending through the body. The adsorptive coating comprises an adsorptive media, such as carbon (usually activated carbon) or ion exchange resin, that is bound by a polymeric adhesive or resin onto the surface of the body. In another embodiment, the coating can comprise a strong oxidizing agent, such as potassium permanganate.

The adsorptive element of the present invention can be used in any variety of applications that desire the removal of chemical contaminants from a fluid (typically gaseous) stream, such as an air stream. Generally, the element can be used in any application such as lithographic processes, semiconductor processing, and photographic and thermal ablative imaging processes. Proper and efficient operation of a fuel cell also desires air (oxidant) that is free of unacceptable chemical contaminants. Other applications where the adsorptive element of the invention can be used include those where environmental air is cleansed for the benefit of those breathing the air. Often, these areas are enclosed spaces, such as residential, industrial or commercial spaces, airplane cabins, and automobile cabins. Personal devices such as respirators or self-contained breathing apparatus are also used to cleanse breathing air. Other times, it is desired to remove contaminants prior to discharging the air into the atmosphere; examples of such applications include automobile fuel system or engine induction system or other vehicle exhaust, exhaust from industrial operations, or any other operation or application where chemical contaminants can escape into the environment.

In one particular aspect, the invention is to a contaminant-adsorbing element or article comprising a body having a thickness of at least 1 centimeter comprising a plurality of passages extending therethrough in a side-by-side array. These passages have a maximum width of no more than about 5 millimeters. A coating substantially covers the passages, the coating comprising a polymeric binder and an adsorbent particulate, such as a carbon particulate. The thickness of the coating (that is, the binder and particulate) is no greater than 0.5 millimeter. The article is substantially free of incidental catalytic activity or any important catalytic activity. Incidental catalytic activity is related to catalysis of reactions not directly related to the removal of a contaminant. These absorptive structures are typically free of catalyst metals such as Pt, Au, Ag, Pd, etc., and catalyst materials used in catalytic converters.

The adsorptive media can be applied to the body or matrix as a melt, a solution or a slurry having the media dispersed therein so that the media is fully imbedded in or covered by the polymeric adhesive. Alternately, the media can be adhered to the body in a manner such that the media is adhered to the surface of the body but is not completely covered by the polymer. Various techniques for applying the adsorptive coating are disclosed.

BRIEF DESCRIPTION OF THE DRAWINGS

Referring now to the drawings, wherein like reference numerals and letters indicate corresponding structure throughout the several views.

DETAILED DESCRIPTION

Figure 1:
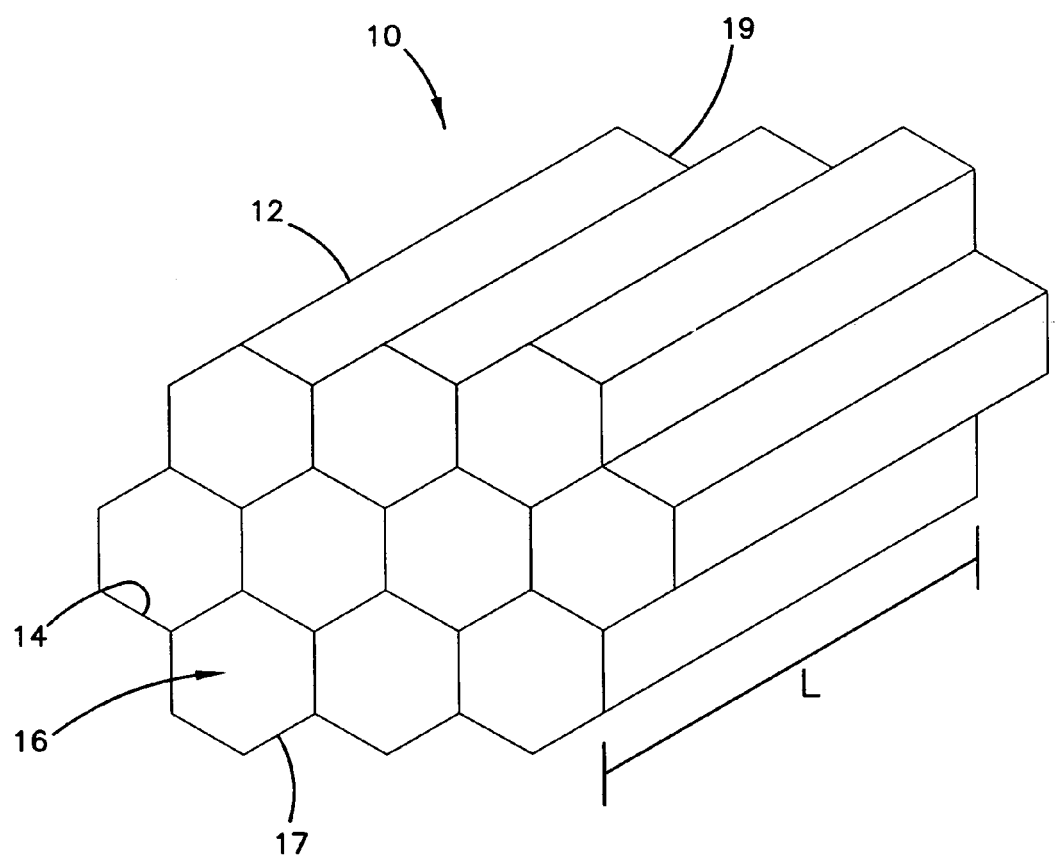
FIG. 1 shows a schematic, perspective view of an adsorptive element according to the present invention.

Referring now to the Figures, specifically to FIG. 1, an adsorptive element or article according to the present invention is shown at 10. Adsorptive element 10 is defined by a structured body 12 having a first face 17 and a second face 19 that is positioned a distance "L" from first face 17. That is, body 10 has a thickness "L" between first face 17 and second face 19. Body 12 includes a plurality of cells 14 therein. Preferably, cells 14 are present in a non-random, orderly array. Cells 14 define passages 16 through body 12 that extend from first face 17 to second face 19.

Figure 2:
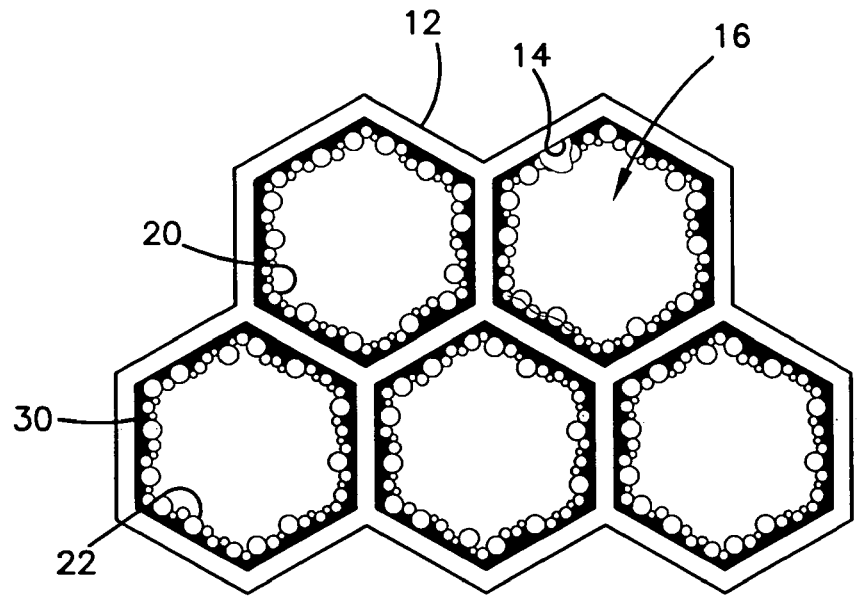
FIG. 2 shows an enlarged, schematic, top plan view of a portion of a first embodiment of the adsorptive element of FIG. 1.
Figure 3:
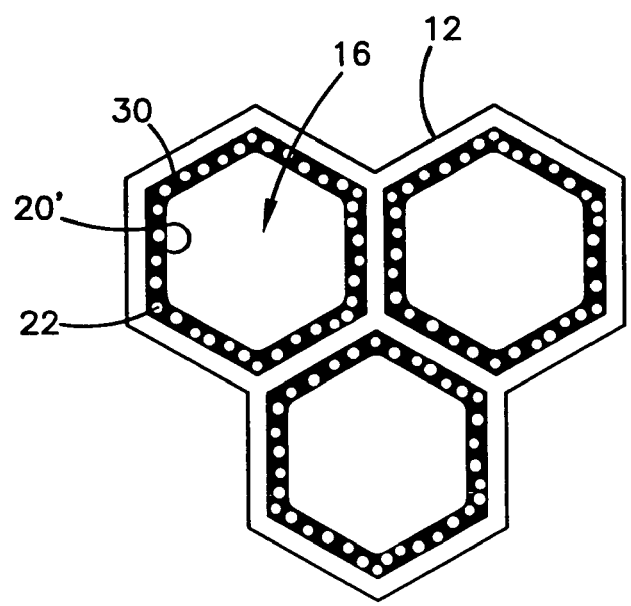
FIG. 3 shows an enlarged, schematic top plan view of a portion of a second embodiment of the adsorptive element of FIG. 1.

Referring now to FIGS. 2 and 3, present on the interior walls of cells 14 is an adsorptive coating 20, 20' that has an adsorptive media 22 retained on cells 14 by a polymeric resin or adhesive 30. Coating 20, 20' is present within cells 14 yet allows air or other fluid to move through passages 16.

Adsorptive coating 20, 20' specifically adsorptive media 22, removes contaminants from the air passing through passages 16 by adsorbing, absorbing, trapping, retaining, reacting, or otherwise removing contaminants from the air stream and transferring them to adsorptive media 22. An adsorptive media 22, such as activated carbon, traps contaminants on its surface or in pores of adsorptive media 22. Depending on the size of the contaminants and the porosity of adsorptive media 22, some contaminants may enter into and become trapped within pores or passages within adsorptive media 22. Typically, the surfaces of the adsorptive media 22 react with the contaminants, thus adsorbing the contaminants at least on the surfaces. Coating 20, 20' can additionally or alternately have an oxidizing agent. When heat is applied, volatile organic compounds (VOCs) that contact coating 20, 20' are oxidized into carbon dioxide and water.

Coating 20 of FIG. 2 comprises a plurality of adsorptive media particles 22 bound to cell 14 by adhesive 30. Typically, media 22 used in coating 20 are spherical in shape, with the particles having generally the same size or a tight distribution of size. Suitable sizes of media 22 for coating 20 include 100 mesh (about 120–125 micrometers) and 150 mesh (about 85 micrometers). Adhesive 30 does not cover the entire surface of media 22; rather, adhesive 30 is present between cell 14 and media 22, and has only partially wicked up and around media 22. Methods for making coating 20 are described below.

Coating 20' of FIG. 3 differs from coating 20 of FIG. 2 in that coating 20' comprises a plurality of adsorptive media particles 22 randomly, and generally homogeneously, dispersed within adhesive 30 that binds media 22 to cells 14. Adhesive 30 essentially covers the entire surface of adsorptive media 22. Coating 20' can be referred to as a "slurry". Typically, media 22 used in coating 20' is smaller in particle size than media used for coating 20, above. Suitable sizes of media 22 for coating 20' include 400 mesh (about 20–25 micrometers) and 250 mesh (about 40 micrometers), although media 22 sizes ranging from 10 micrometers to about 80 micrometers are suitable. The same media 22 as used for coating 20, above, can be used for coating 20'. Additionally, irregularly shaped media 22, where the particles are not generally spherically shaped nor fall within a tight size distribution, can be used in coating 20'. Methods for making coating 20' are also described below.

Body of the Adsorptive Element

Body 12 provides the overall structure of adsorptive element 10; body 12 defines the shape and size of element 10. Body 12 can have any three-dimensional shape, such as a cube, cylinder, cone, truncated cone, pyramid, truncated pyramid, disk, etc., however, it is preferred that first face 17 and second face 19 have essentially, or at least close to, the same area, to allow for equal flow into passages 16 as out from passages 16. The cross-sectional shape of body 12, defined by either or both of first face 17 and second face 19, can be any two dimensional shape, such as a square, rectangle, triangle, circle, star, oval, and the like. An annular shape can also be used. Preferably, the cross-section of body 12 is essentially constant along length "L" from first face 17 to second face 19.

Typically, first face 17 and second face 19 have the same area, which is at least 1 cm$^2$. Additionally or alternatively, first face 17 and second face 19 have an area that is no greater than about 1 m$^2$. In most embodiments, the area of faces 17, 19 is about 70 to 7500 cm$^2$. Specific applications for element 10 will have preferred ranges for the area. The thickness "L" of body 12, between first face 17 and second face 19, is generally at least 0.5 cm, and generally no greater than 25 cm. In most embodiments, "L" is about 2 to 10 cm. The dimensions of body 12 will vary based on the material used for body 12 and the intended application of element 10. For example, when adsorptive element 10 is intended to be used in an air intake for an automobile engine, first face 17 and second face 19 are generally at least 50 cm$^2$ and no greater than about 200 cm$^2$, typically about 75 to 150 square cm, and in one embodiment, about 77.5 to 155 cm$^2$.

Body 12 can be any material having the desired cell structure. Each of cells 14 has a cross-sectional area typically no greater than about 50 mm$^2$; this cross-sectional area is generally parallel to at least one of first face 17 and second face 19. Alternately or additionally, cells 14 typically have an area no less than about 1 mm$^2$. Generally the area of each cell 14 is about 1.5 to 30 mm$^2$, often about 2 to 4. In one preferred embodiment, the area of a hexagonal cell 14 is about 7 to 8 mm$^2$. In another preferred embodiment, the area of a hexagonal cell 14 is 1.9 mm$^2$.

Cells 14 may have any shape, for example square, rectangular, triangular, circular, but a preferred shape is hexagonal or substantially hexagonal. A hexagonal or substantially hexagonal array is often referred to as a "honeycomb" shape or pattern.

The longest cross-sectional dimension of cells 14 is typically no greater than 10 mm, often no greater than 6 mm. Additionally, the shortest dimension of cells 14 is no less than 1 mm, often no less than 1.5 mm. In most embodiments, cells 14 have a maximum dimension of no greater than 5 mm.

The total, internal surface area of each elongate cell 14 or passage 16 is generally no less than about 5 mm$^2$, and is generally no greater than about 200 cm$^2$. The total surface area of article 10, as defined by the interior surface area of passages 16, is at least about 200 cm$^2$ or about 250 cm$^2$ to 10 m$^2$.

The cell walls, which define the shape and size of cells 14 and passages 16, are generally at least 0.015 mm thick. Alternately or additionally, the cell walls are generally no thicker than 2 mm. Typically, the cell walls are no greater than 1 mm thick. In one preferred embodiment, the walls are no greater than 0.5 mm thick. In an alternate preferred embodiment, the cell walls are no greater than 0.1 mm thick. In some embodiments, the walls may be no greater than 0.02 mm thick. The thickness of the walls will vary depending on the size of cell 14, the size of passage 16, the material from which body 12 is made, and the intended use of element 10.

In most embodiments, each of cells 14 has a continuous size and shape along its length. Generally, the length of each cell 14 is essentially the same as the thickness "L" between first face 17 and second face 19. Preferably, the shape of cells 14 does not appreciably change from first face 17 to second face 19, and each of cells 14 has a similar cross-sectional shape.

Examples of suitable materials for body 12 include metal, such as aluminum, plastic, such as polycarbonate, and composite materials. Cellulose based materials may also be used. These materials can be molded, extruded, or otherwise formed to the desired shape of body 12.

Adsorptive Coating

Adsorptive coating 20, 20' adsorbs, absorbs, reacts with, or otherwise removes contaminants from air or other gaseous fluid that come into contact with it. Adsorptive coating 20, 20' is present on body 12 and comprises a reactive or otherwise adsorptive media 22 and a polymeric adhesive 30. Adhesive 30 binds adsorptive media 22 to cells 14 of body 12 without detrimentally affecting the adsorptive effectiveness of adsorptive media 22.

Adsorptive coating 20, 20' is present on the walls of cells 14, covering at least 50% of the surface area of the walls. Preferably, coating 20, 20' covers at least 55 to 90% of the walls, and more preferably, is continuous with no areas without adsorptive coating 20, 20'. Coating 20, 20' generally has a thickness of about 1 to 4 mil (about 25 to 100 micrometers), although thicker coatings can be used, provided that the flow of fluid through passage 16 is not detrimentally affected. It is understood that the size of the adsorptive media 22 will effect the thickness of coating 20, 20'.

In some embodiments, coating 20, 20' may include a small amount of solvent, which is left over from the coating process. The amount and type of residual solvent will depend on the specific polymeric material 30 used, whether or not any solvent was used, and the coating process.

Adsorptive coating 20, 20' is substantially free of catalytic activity, meaning that there is substantially no material present in coating 20, 20' that is considered a "catalyst". It is understood that activated carbon, ion exchange resin, and other useful adsorptive media 22 may have some inherent catalytic properties that are incidental with the adsorptive properties of media 22. The attempt of the present invention is to avoid additional catalysts.

Adsorptive Media

Adsorptive media 22 adsorbs, absorbs, reacts with, or otherwise removes contaminants from air or other gaseous fluid that contacts media 22. In some embodiments, adsorptive media 22 itself may be the reactive material that removes the contaminants. Examples of such materials include materials such as polymer particulates including ion exchange resins, sodium bisulfate, activated carbon media, zeolites, getters, clays, silica gels, superacids and/or heteropolyacids, nanosorbents, nanotubes, and metal oxides.

Suitable activated carbons include 50–100 mesh activated carbon beads, 50–100 mesh activated carbon granules, and 325–400 mesh carbon granules. Carbon fibers can also be used. Examples of suitable ion exchange resins include dry Dowex® 50WX8-100 ion exchange resin, Dowex® 50WX8-200 ion exchange resin, and Dowex® 50WX8-400 ion exchange resin.

Oxidizing agents, available as particulate or powders, can also or alternatively be used in coating 20, 20'. Oxidizers, such as potassium permanganate, react with VOCs to form carbon dioxide and water.

Oxidizing agents or other reactive material can be provided as surface coating on active or inert carriers such as granular particulate, beads, fibers, fine powders, nanotubes, and aerogels to provide adsorptive media 22. Alternately or additionally, the material that forms the reactive surfaces may be present throughout at least a portion of the carrier; this can be done, for example, by impregnating the carrier material with a desired reactive material. Carbon is a common carrier material.

Adsorptive coating 20, 20 can be constructed to filter out or otherwise remove airborne basic contaminant compounds that include organic bases such as ammonia, amines, amides, N-methyl-1,2-pyrrolidone, sodium hydroxides, lithium hydroxides, potassium hydroxides, volatile organic bases and nonvolatile organic bases. Alternately, adsorptive coating 20, 20' can be constructed to filter out airborne acidic compounds such as sulfur oxides, nitrogen oxides, hydrogen sulfide, hydrogen chloride, and volatile organic acids and nonvolatile organic acids. It is understood that in addition to removing, for example, acidic compounds or basic compounds, adsorptive media 22 can absorb or adsorb additional contaminants, such as hydrocarbons, or polar or non-polar organics. Examples of organics include any of the components of gasoline and diesel fuels.

An example of a preferred material for removing basic contaminants, such as ammonia, is activated carbon granules or particulate impregnated with citric acid. An example of a preferred material for removing acid contaminants is activated carbon granules or particulate impregnated with potassium carbonate.

In a preferred embodiment, adsorptive media 22 is activated carbon granules impregnated with, or having a surface coating thereon, of a reactive or other modifying agent. The granules generally have a particle size as small as about 10 micrometers, or as large as 600 micrometers (about 30 mesh). If the adsorptive media granules are too large, passage 16 may be unacceptably blocked or restricted by the media. In most embodiments, the granules have a particles size of about 35 (about 400 mesh) to 50 micrometers (about 300 mesh).

Element 10 can have two different adsorptive medium 22 present in coating 20, 20'. For example, a first, basic media can be used to remove acidic contaminants and a second, acidic media can be used to remove basic contaminants. It is generally undesirable to intimately mix a basic media with an acidic media, because the two will typically react with or otherwise cancel each other out. Preferably, the two different media are positioned in series along the air flow path through passages 16. For example, element 10 can be made with the first media occupying the half of body 12 closest to first face 17 and the second media can occupy the half of body 12 closest to second face 19. In another example, the first media can be applied on a first body and the second media can be applied to a second body. The two bodies can be axially stacked with passages 16 generally aligned, so that air first passes through the element having the first media and then through the element having the second media.

It is understood that other constructions and arrangements of elements with various media, impregnants, and the like can be used.

Polymeric Adhesive

Adsorptive media 22 is retained on body 12 by polymeric adhesive 30. Examples of suitable polymers include polyamides, polyesters, poly-vinyl acetate, polyurethanes, and a variety of block copolymers and elastomers such as butyl rubber, ethylene-propylene copolymer, and styrene-butadiene rubber. Polyethylene glycol and polymethacrylates, such as polyhydroxyethyl methacrylate, can also be used. The polymers used to bind media 22 may be water based or solvent based. The polymers may be coated as a solution or dispersion, or processed as a hot melt material.

Various Methods for Making the Adsorptive Element
Melt Coating

A first method for making adsorptive element 10 is by a melt coating process. Melt coating is where a body 12, such as a honeycomb body, is coated with a melted polymeric material (polymeric adhesive 30), typically a hot melt polymeric material. Adsorptive media 22 is adhered to body 12 by the melting polymeric material 30.

Suitable polymers for such a melt coating process include polyamides, polyesters, poly-vinyl acetate, polyurethanes, and a variety of block copolymers and elastomers such as butyl rubber, ethylene-propylene copolymer, and styrene-butadiene rubber. The polymers may be present as solutions in a solvent, such as in acetone or methanol. During coating, body 12 sits in a vertical position for a desired duration and is flipped over for another desired duration to totally wet the interior surfaces of cells 14. Next, passages 16 are air blown to drain the excess polymeric solution and to form a thin polymeric film on body 12. Coated body 12 can be allowed to air dry, at least partially, at ambient or slightly elevated temperature. Coated body 12 is buried in adsorptive media 22 so that cells 14 are packed with media 22. The body-media combination is heated above the softening point of polymeric adhesive 30 to melt the polymeric film, and is then cooled to room temperature to bond adsorptive media 22 to the surfaces of body 12. Compressed air or an air knife is used to remove any of the excess adsorptive media 22. Coated body 12 can be washed with a solvent to further remove excess adsorptive media 22 and to strengthen adhesion between adsorptive media 22 and polymeric adhesive 30. Any residual solvent can be dried off at elevated temperatures. Thus, element 10 having evenly bonded adsorptive media 22 thereon is obtained.

FIG. 2 is a representative schematic figure of an element 10 made by a melt coating process.

Example: A circular aluminum substrate body, 1 inch (2.54 cm) thick and 1.5 inch (3.8 cm) in diameter, having honeycomb cells of about 1/16 inch (1.59 mm), was dip coated with polyvinyl acetate (PVAc) solution (20% in methanol). The body was allowed to sit in a vertical position for 1 minute before flipping it over and sitting for another 1 minute. Then, the body was air blown to drain the excess PVAc and then dried at room temperature to form a thin PVAc film. Next, the body was packed with dry Dowex® 50WX8-100 ion exchange resin, and the packed body was heated at 90° C. for 30 minutes. The body was cooled down to room temperature before removing from the oven. An aluminum honeycomb body with evenly bonded Dowex® 50WX8-100 ion exchange resin on its surface was obtained after the excess adsorbent was blown off, washed off with methanol, and oven dried to remove residual methanol.

Shaker Coating Method

A second method for making adsorbent element 10 is by a shaking or shaker coating process to coat body 12 with a thin adsorptive coating 20. Adsorptive media 22 is adhered to body 12 via polymer binder 30 to form an adsorptive coating similar to coating 20 in FIG. 2. Body 12 and adsorptive media 22 are placed into a sealed container that is then vigorously shaken to thoroughly coat body 12 with media 22. The coated body 12 is removed and polymeric adhesive 30 is dried or cured.

Polymeric binders 30 that can be used in this process are from a wide range of solvent or aqueous based polymers and/or adhesives. Some typical polymeric materials 30 include latexes, polyurethanes, epoxies, unsaturated polyesters, phenol formaldehyde, polyamides, and elastomers. Adsorptive media 22 can be any type of porous material including carbon, ion exchange resin, zeolites, and molecular sieves. Polymer binder 30 is coated on body 12 by dipping body 12 into a container of polymer binder 30. Polymer 30 is allowed to adhere to the sides of cell 14 and passage 16. Any excess polymer binder 30 can be blown out of passages 16 with an air knife, or can be spun at a relatively high speed using centrifugal force to remove the excess polymer 30. The coated body 12 can be air dried, at least partially, typically 10 seconds to 15 minutes.

Example: A circular aluminum substrate body, 1 inch (2.54 cm) thick and 1.5 inch (3.8 cm) in diameter, having honeycomb cells of about 1/16 inch (1.59 mm), was dip coated with a 100% latex material obtained from Dow Chemical. The coated body was air dried for 2 minutes, after which an air knife was used to remove the excess material. The body was allowed to continue to air dry for another 5 minutes. The coated body was placed into a sealed container with 100 mesh ion exchange resin (adsorptive media) and vigorously shaken for 2 minutes with a paint shaker. Any excess adsorptive media was blown out using an air knife;

this aided in the removal of loose particles. This step was followed by an accelerated curing/drying step in an oven at 60° C. for 1 hour.

Figure 4:
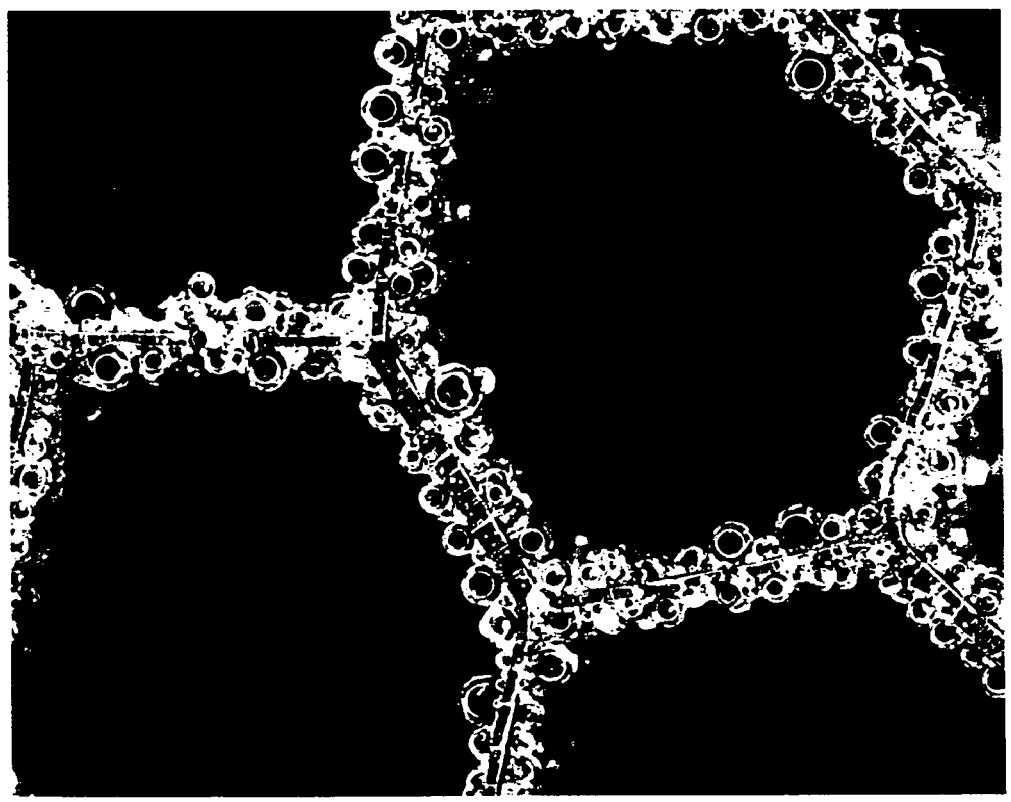
FIG. 4 is a photomicrograph taken with a scanning electron microscope of an adsorptive element of the embodiment of FIG. 2 made by the Shaker coating method.
Figure 5:
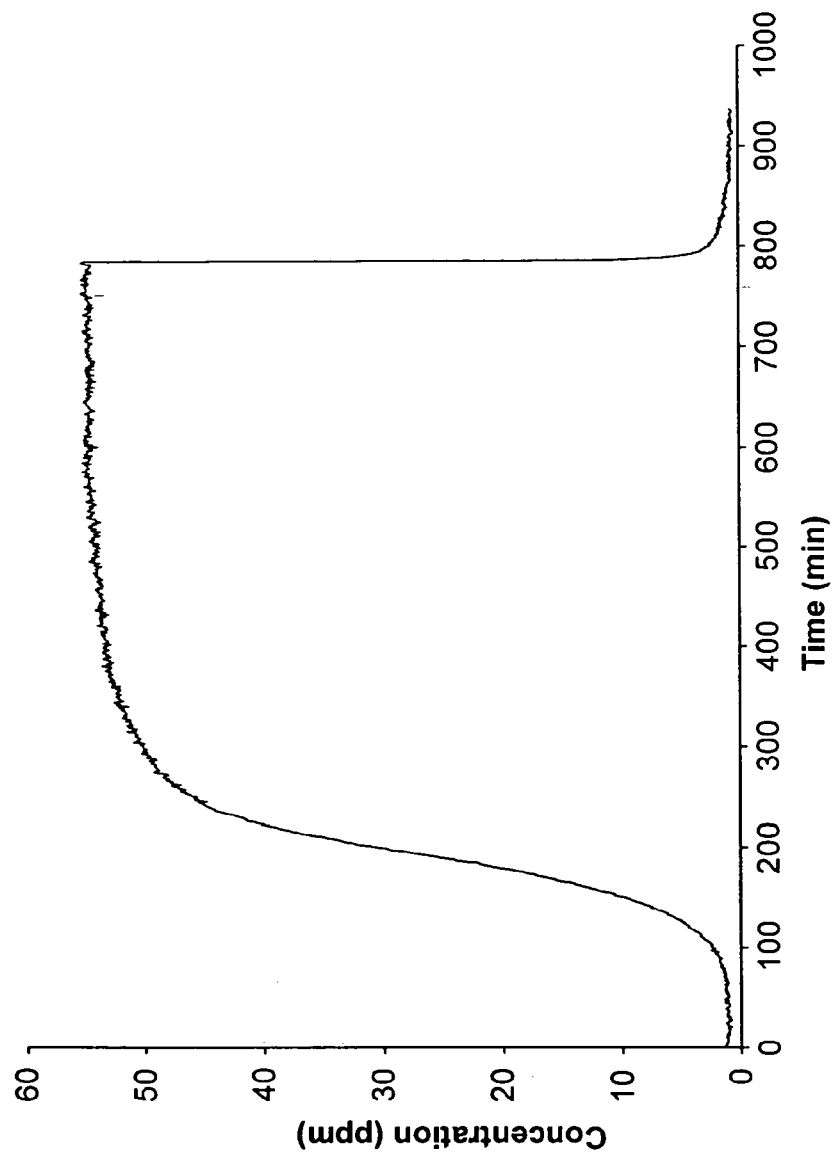
FIG. 5 is a graphical representation of the breakthrough of contaminants through the element of FIG. 4.

FIG. 4 is an SEM photomicrograph of the resulting element, and FIG. 5 is a graphical representation of the breakthrough of contaminants through the resulting element.

Push-Pull Coating Method

A third method for making adsorptive element 10 is a coating process referred to as a push-pull process. The push-pull method coats a body 12 with a thin coating of adsorptive slurry that contains adsorptive media 22 dispersed in adhesive 30, generally with a solvent. The resulting adsorptive coating is represented schematically in FIG. 3 as coating 20'.

Adsorptive media 22 can be any type of porous material including carbon, ion exchange resin, zeolites, and molecular sieves, generally with a particle size range of 10 to 150 microns. The slurry can also include an impregnant or other additive such as an adsorptive enhancer. Polymer binder 30 can be any suitable polymer such as polyethylene glycol, poly(2-hydroxyethyl methacrylate), polymethyl acrylate, polyethyl acrylate, poly-n-butyl acrylate, polyvinyl alcohol, polyvinyl acetate, and variations thereof. If used, the solvent system can be any material that dissolves polymer binder 30, including water and alcohol. The adsorptive media 22 is thoroughly dispersed throughout adhesive 30. This slurry is pumped slowly through passages 16, usually over a total elapsed time of about 1 minute. Then, the slurry is pulled back through the cells.

Figure 6A:
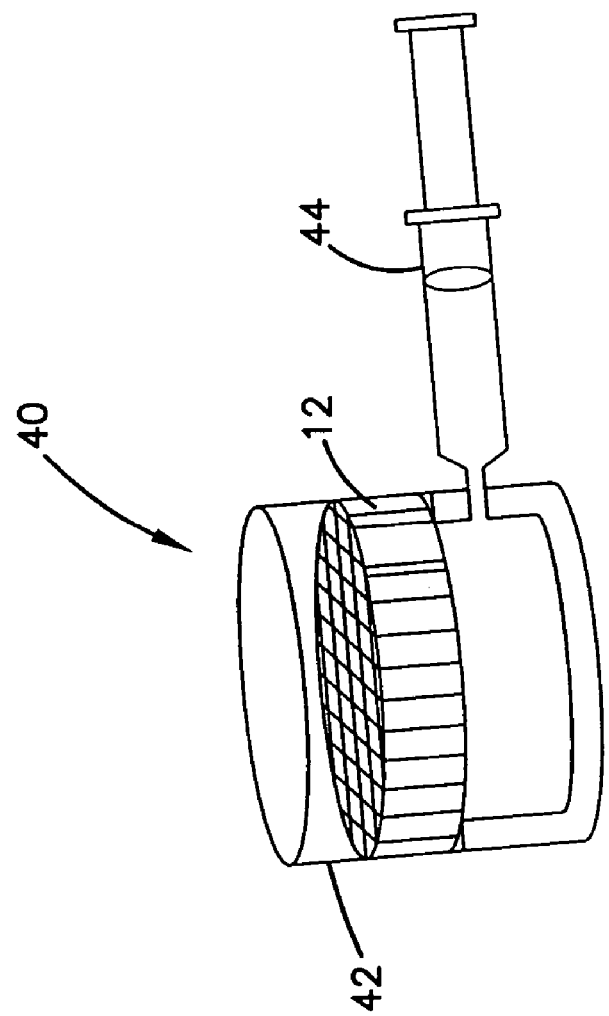
FIG. 6A is a schematic depiction of a first apparatus for Push-Pull coating an adsorptive element according to the present invention.
Figure 6B:
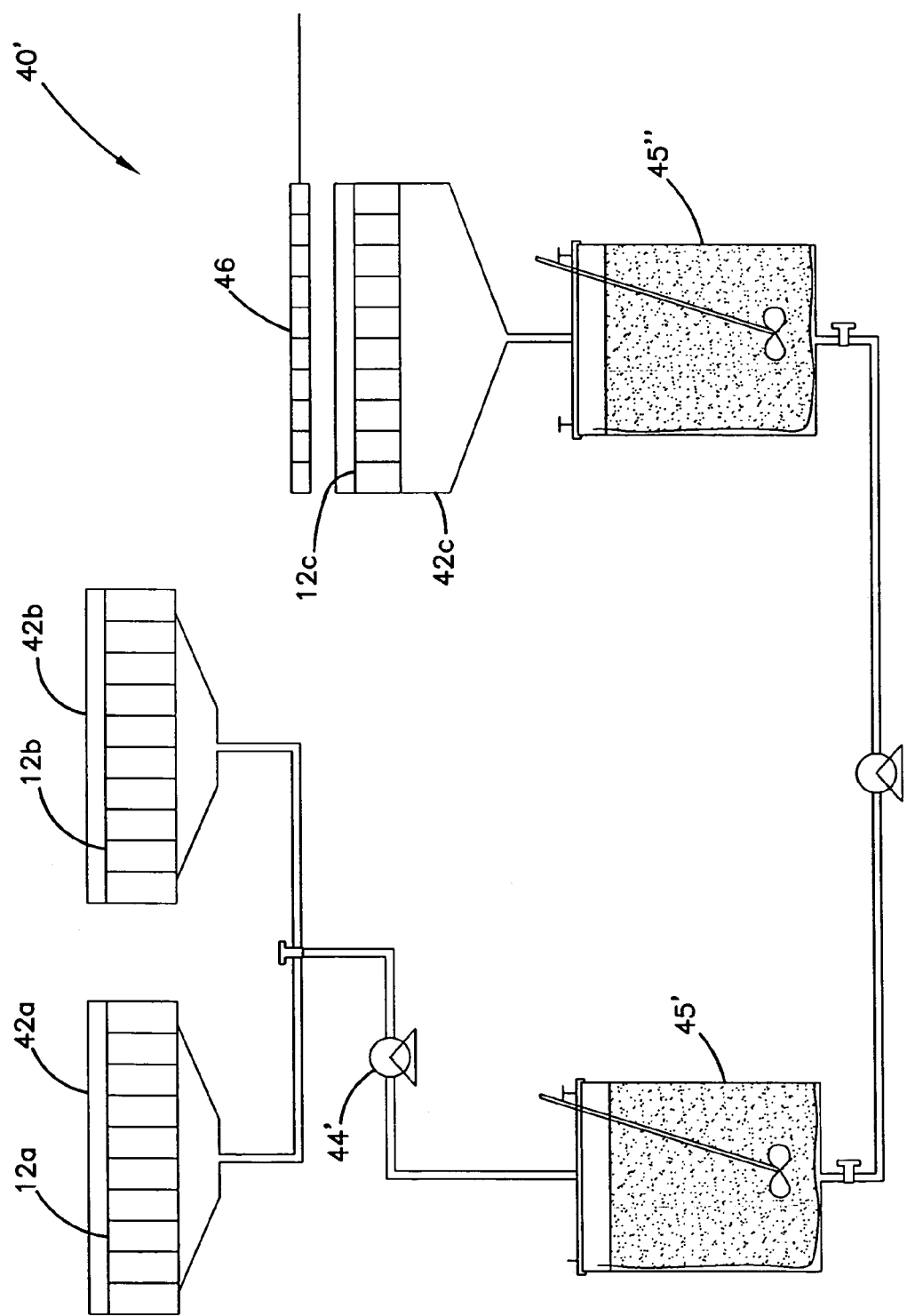
FIG. 6B is a schematic depiction of a second apparatus for Push-Pull coating an adsorptive element according to the present invention.

FIG. 6A, which schematically depicts a first push-pull apparatus, shows an apparatus 40, a holder 42 for body 12, and a pump 44. See also, FIG. 6B, which shows an apparatus 40', a first holder 42a for a body 12a and a second holder 42b for a second body 12b. A pump 44' provides the adsorptive slurry from tank 45' to bodies 12a, 12b. Appropriate piping is used to connect holders 42a, 42b, pump 44' and tank 45'. After being coated in holders 42a, 42b, bodies 12a, 12b are relocated to holder 42c (as body 12c) where an air knife 46 removes excess slurry from body 12c. The excess slurry drains to tank 45", from which it is recycled to tank 45' and reused.

Another example of a usable apparatus for the push-pull coating method is disclosed is U.S. Pat. No. 5,182,140 to Watanabe et al. Any loose material can be removed via centrifugal force (e.g., by circular rotation of body 12 perpendicular about the sample holder's axis at 1600 rpm), or by high velocity air jet, such as from an air knife. The coated body 12 is then placed in an oven to dry/cure the coating.

Example: A slurry was produced using 170 mL ethanol, 72 grams citric acid, 7.5 grams poly(2-hydroxyethyl methacrylate), and 126 grams impregnated carbon particles (400 mesh size). This slurry was pushed through an aluminum substrate body, which had 1/16 inch (1.59 mm) hexagonal honeycomb cells, at a rate of 1 inch/min (about 2.54 cm/min). The slurry was held above the body as a pool of slurry for about 1 minute. The slurry was then pulled back through the honeycomb body. An air knife was passed over this coated body to remove any excess residual materials. The weight of the element doubled as a result of the coating.

Figure 7:
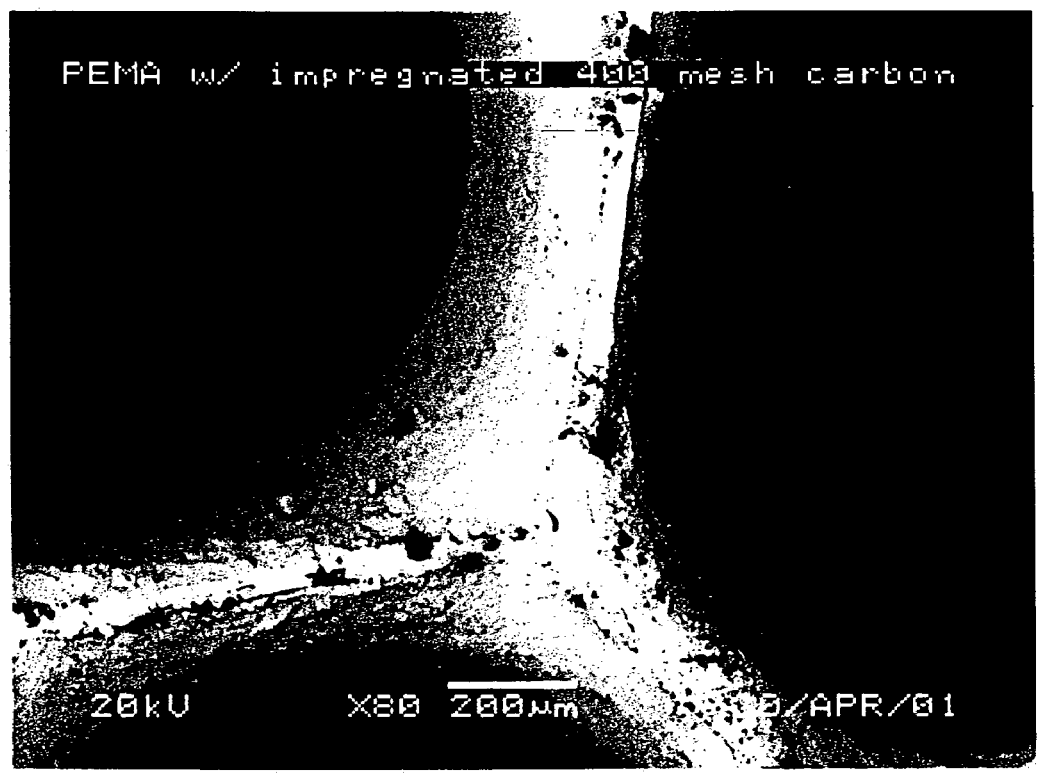
FIG. 7 is a photomicrograph taken with a scanning electron microscope of an adsorptive element according to the present invention made by the Push-Pull coating method.
Figure 8:
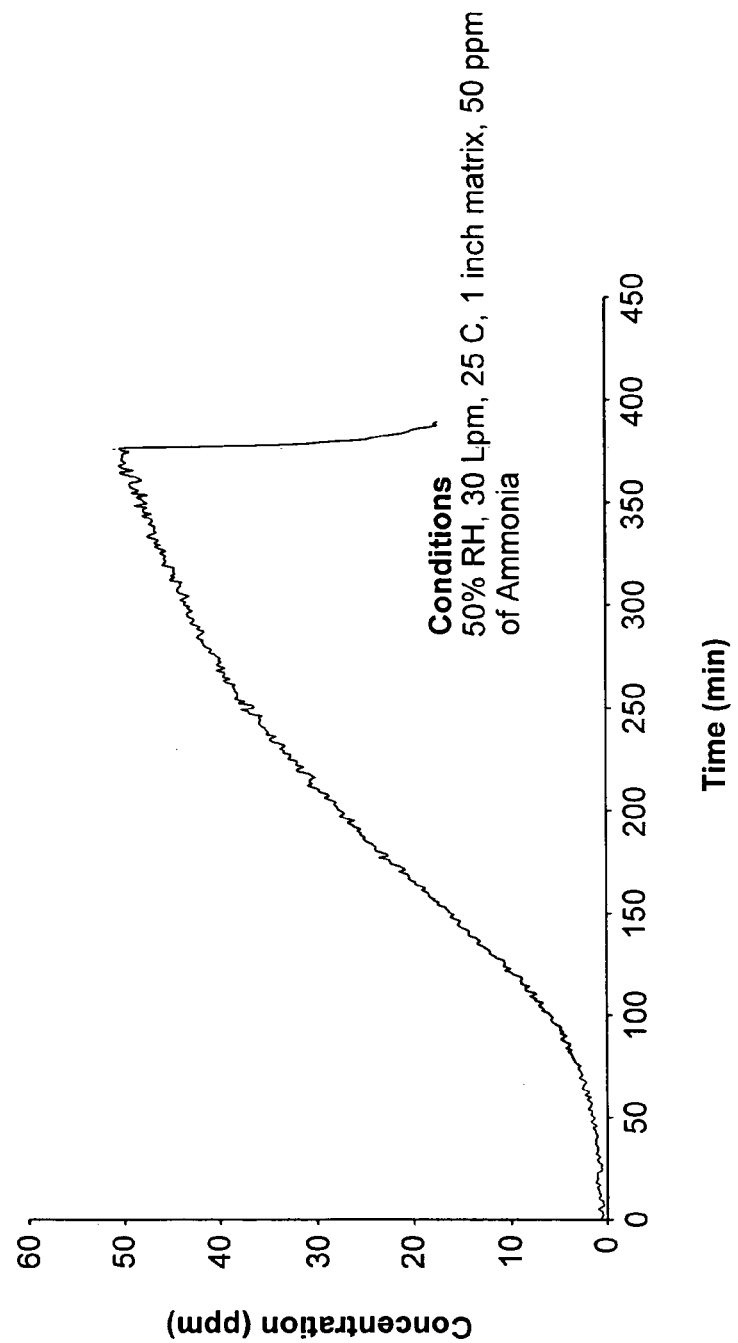
FIG. 8 is a graphical representation of the breakthrough of contaminants through the element of FIG. 7.

FIG. 7 is an SEM photomicrograph of the resulting element, and FIG. 8 is a graphical representation of the breakthrough of contaminants through the resulting element.

Melt-Matrix Coating Process

A further method for providing an adsorptive coating 20 is a "melt-matrix" approach that binds adsorptive media 22 to body 12 by gently melting, or at least softening, body 12 in the presence of adsorptive media 22. Body 12, or a portion of body 12, functions as adhesive 30. To coat body 12, body 12 is embedded into a bed of adsorptive media 22. The media 22 and body 12 are heated to the melting or softening point of the body and allowed to sit and at least partially cool. Adsorptive media 22 adheres to the melted or softened body 12. Body 12 could be partially melted prior to embedding into media 22. Additionally, instead of embedding body 12 into a bed of media 22, adsorptive media 22 can be shaken or sprinkled onto melted body 12.

Typically, bodies 12 used with a melt-matrix coating process are made from a thermoplastic material. Bodies 12 made from polyethylene or polypropylene are preferred because of their low melting temperatures. Such thermoplastic honeycomb shaped bodies are readily available from various suppliers.

The resulting adsorptive element 10 made from a melt-matrix process will typically be similar to element 10 having coating 20, shown in FIG. 2.

Pyrolysis Coating Method

Yet another method for providing an adsorptive coating is to pyrolyze a polymer carbon precursor that is coated onto a body substrate. In some embodiments it may be preferred that the body is a ceramic material. First, the body is contacted with a polymer carbon precursor, which is a polymeric material having available carbon groups; examples of typical polymer carbon precursors include polyacrylonitrile (PAN), phenolic resin, polyimide resin, furanic resin, and furfuryl alcohol. The body can be air blown to remove any excess polymeric material, after which the polymer carbon precursor is cured by heating. The coated body, with the polymeric carbon precursor, is heated under conditions effective to convert the cured polymeric carbon precursor to carbon, generally, at a temperature of about 400° C. to 1200° C., and usually about 600° C. to 800° C. Activation of the carbon can be done by either chemical or physical activation. Physical activation done by using gasification agents ($CO_2$ or steam), while a chemical activation agent ($ZnCl_2$) can be used for chemical activation before the carbonization step.

Example: A circular body (cellular structure, 1 inch (2.54 cm) thick and 1.5 inch (3.81 cm) in diameter) with a density of 400 cells/in$^2$ (62 cells/cm$^2$), a wall thickness of 0.15 mm, and 35% porosity, was dipped in a polyacrylonitrile (PAN) solution (8% in N,N-dimethyl formamide) and was soaked for about 10 minutes. The excess PAN was drained from the body by rotating the coated body at a spin rate of 1600 rpm. The PAN was cured at a temperature of 150° C. for 1 hour. The cured substrate was carbonized by heating in a tube furnace at a rate of 10° C./min up to 700° C. and a holding time of 1 hour, all under a $N_2$ gas flow (100 cc/min). The baked body was cooled to room temperature under a $N_2$ atmosphere (100 cc/min). The activation process was carried out at 700° C. with $CO_2$ (100 cc/min) as activating agent for 1 hour. The flowing gas was changed back to $N_2$ (100 cc/min) and the body was left to cool down to room temperature in the furnace. The carbon-ceramic material was soaked in 35% citric acid for 30 minutes, and baked at 60° C. again for 10 hours.

Post-Treatment of the Coating

The adsorptive elements made by any of the preceding processes can be subjected to a post-treatment process to modify the reactivity of adsorptive coating 20, for example, if adsorptive media 22 itself cannot provide the desired level of adsorption or reactivity. Generally, element 10 can be made, for example by the push-pull coating method or by melt-coating process, and then treated with an impregnant, oxidant, or other material to affect the adsorptive properties of element 10. Suitable post-treatment materials such as potassium permanganate, calcium carbonate, potassium carbonate, sodium carbonate, calcium sulfate, or mixtures thereof.

Example 1 with Post-Treatment: A circular aluminum substrate (1 inch (2.54 cm) deep and 1.5 inch (3.82 cm) in diameter) having honeycomb cells with a diameter of 1/16 inch (1.59 mm) was coated with polyvinyl alcohol (PVA) (5% in water). The coated body sat in a vertical position for 1 minute and was then flipped to sit in the opposite position for 1 minute. Excess PVA was blown off. Activated carbon powder, 50–100 mesh (about 150 to 300 micrometer) was applied to the body and shaken through the body passages using a paint shaker. The carbon-coated body was baked at 120° C. for 1 hour, taken out, washed with 35% citric acid for 30 minutes, and baked at 60° C. for 10 hours.

Example 1 without Post-Treatment: For comparison, another sample was prepared using the same polymer adhesive as above but with 35% citric acid impregnated carbon powder (325 mesh (45 micrometer)) as the adsorptive media without any post-treatment.

A breakthrough test with a residence time of 0.06 second was done to test the adsorption capacities of the examples. The samples were conditioned until the relative humidity reached 50% and temperature reached 25° C. Air containing ammonia (50 ppm) flowed through the sample being tested with a flow rate of 30 liters/minute. The non-post treated example had a 90% efficiency breakthrough time of 7 minutes, and the post treated example had a 90% efficiency breakthrough time of 66 minutes.

Example 2 with Post Treatment and Example 2 without Post-Treatment:

These examples were made according to the same manner as Examples 1, above, except that a different polymer adhesive, a nylon polymer, was used for Examples 2 instead of PVA. Two coated substrates were made and tested as above with the ammonia breakthrough test. The example without post-treatment method had a 90% efficiency breakthrough time of 9 minutes, and the example with citric acid post-treatment had a 90% efficiency breakthrough time of 100 minutes.

Effect of Adsorptive Media Particle Size

Figure 9:
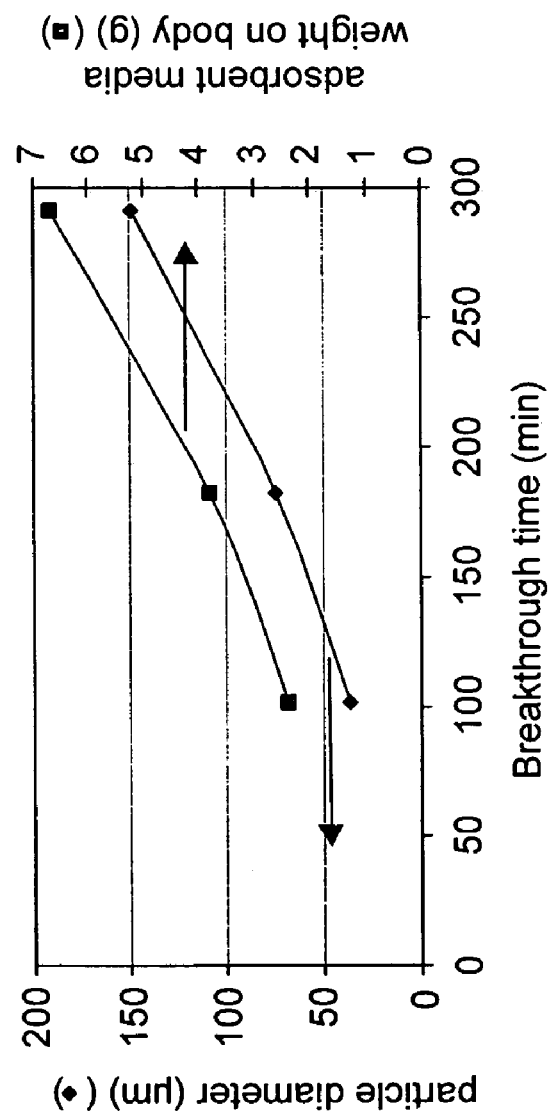
FIG. 9 is a graphical representation of the effect of adsorptive media particle size on breakthrough test results for elements made by the Melt coating method.

The effect of adsorptive media 22 particle size on the performance of adsorptive elements 10 for ammonia removal was evaluated. An adsorptive element according to the present invention was produced using the melt coating method described above with an aluminum body having honeycomb shaped passages there through. Three different sizes of adsorptive media 22 were used. The adsorptive particulates were strong cation-exchange resin materials having an average particle size of 100, 200, and 400 mesh (about 150 micrometers, 74 micrometers, and 37 micrometers, respectively). The coated honeycomb body was initially conditioned at 50% RH. Ammonia, at 50 ppm, was then fed through the element. The relationship between adsorbent particle size and breakthrough time is shown in the graph of FIG. 9.

Other Additives to Coating

Coating 20, 20' can include additives to modify the adsorptive properties of adsorptive media 22 or of coating 20, 20' in general. For example, coating 20, 20' can be modified to improve the removal of acid gases such as $SO_2$, HCl, $HNO_3$, $H_2S$, HCN, etc. Examples of additives include ion exchange resins and impregnants, which can be impregnated into media 22, especially into carbon particulate. An example of a suitable impregnant is potassium carbonate.

Figure 10:
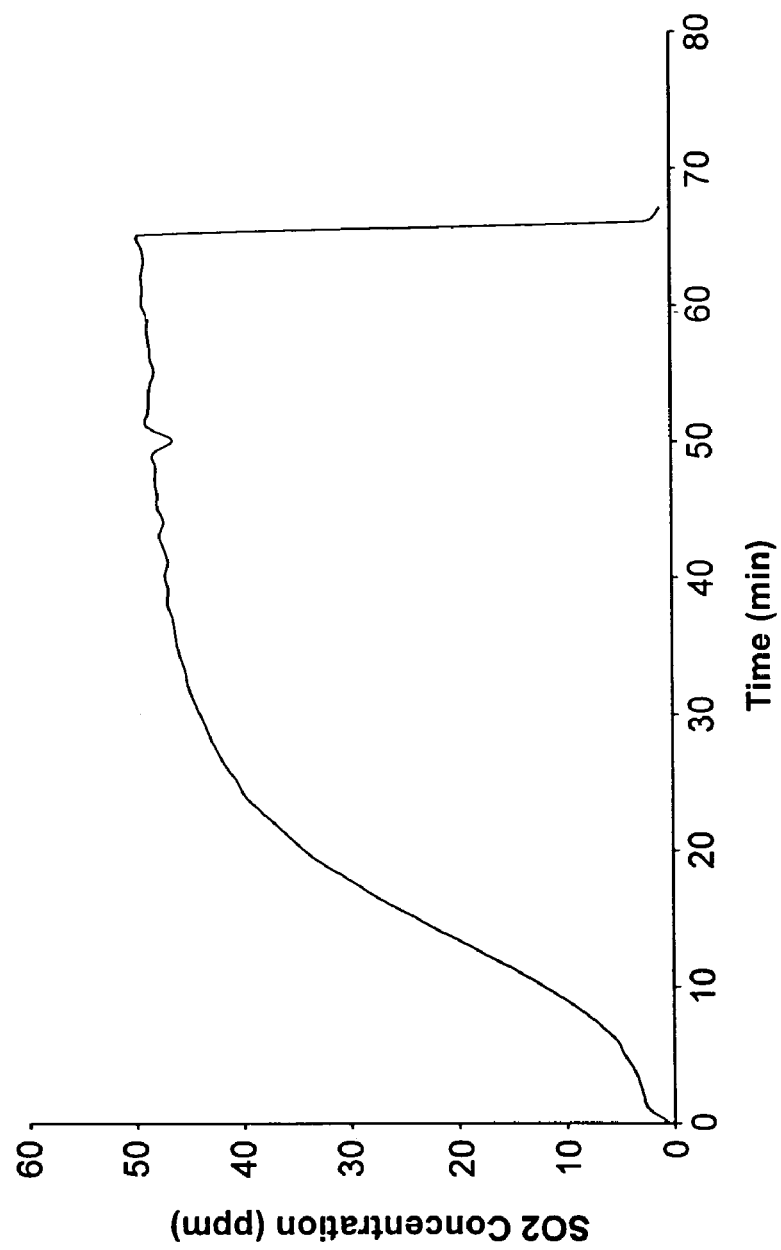
FIG. 10 is a graphical representation showing a breakthrough curve for sulfur dioxide acid gas.

Example: A slurry of an impregnated adsorbent media, binder and solvent were mixed and coated onto a honeycomb body using the Push-Pull coating method described above. The adsorptive media used was a 20% potassium carbonate impregnated carbon, the binder was poly(2-hydroxyethyl methacrylate), and the solvent was ethyl alcohol. An acid gas breakthrough test was conducted using sulfur dioxide at 50 ppm and a relative humidity of 50%. The results of the breakthrough test are shown in the graph of FIG. 10.

Applications for Adsorptive Element 10

Adsorptive element 10 of the present invention, made by any of the methods described above, can be used in any variety of applications that desire the removal of chemical contaminants from a fluid stream, such as an air stream. Examples of contaminants or active material that can be removed by adsorbent element 10 include any of acidic contaminants, basic contaminants, VOCs, organics, carbon monoxide and carbon dioxide, water, oxygen and ozone, nitrogen and hydrogen.

Generally, adsorptive element 10 can be used in any application where a packed granular bed has been used; such applications include lithographic processes, semiconductor processing, photographic and thermal ablative imaging processes. Proper and efficient operation of a fuel cell would benefit from intake air that is free of unacceptable chemical contaminants. Other applications where adsorptive element 10 can be used include those where environmental air is cleansed for the benefit of those breathing the air. Adsorptive element 10 can be used with personal devices such as respirators (both conventional and powered) and with self-contained breathing apparatus to provide clean breathing air. Adsorptive element 10 can also be used on a larger scale, for enclosed spaces such as residential and commercial spaces (such as rooms and entire buildings), airplane cabins, and automobile cabins. At other times, it is desired to remove contaminants prior to discharging the air into the atmosphere; examples of such applications include automobile or other vehicle emissions, exhaust from industrial operations, or any other operation or application where chemical contaminants can escape into the environment.

Adsorptive element 10 is typically positioned in a housing, frame or other type of structure that directs fluid flow (e.g., air flow) into and through passages 16 of element 10. In many configurations, element 10 is at least partially surrounded around its perimeter by a housing, frame or other structure. One example of ductwork into which element 10 can be positioned is shown in FIG. 11.

Figure 11:
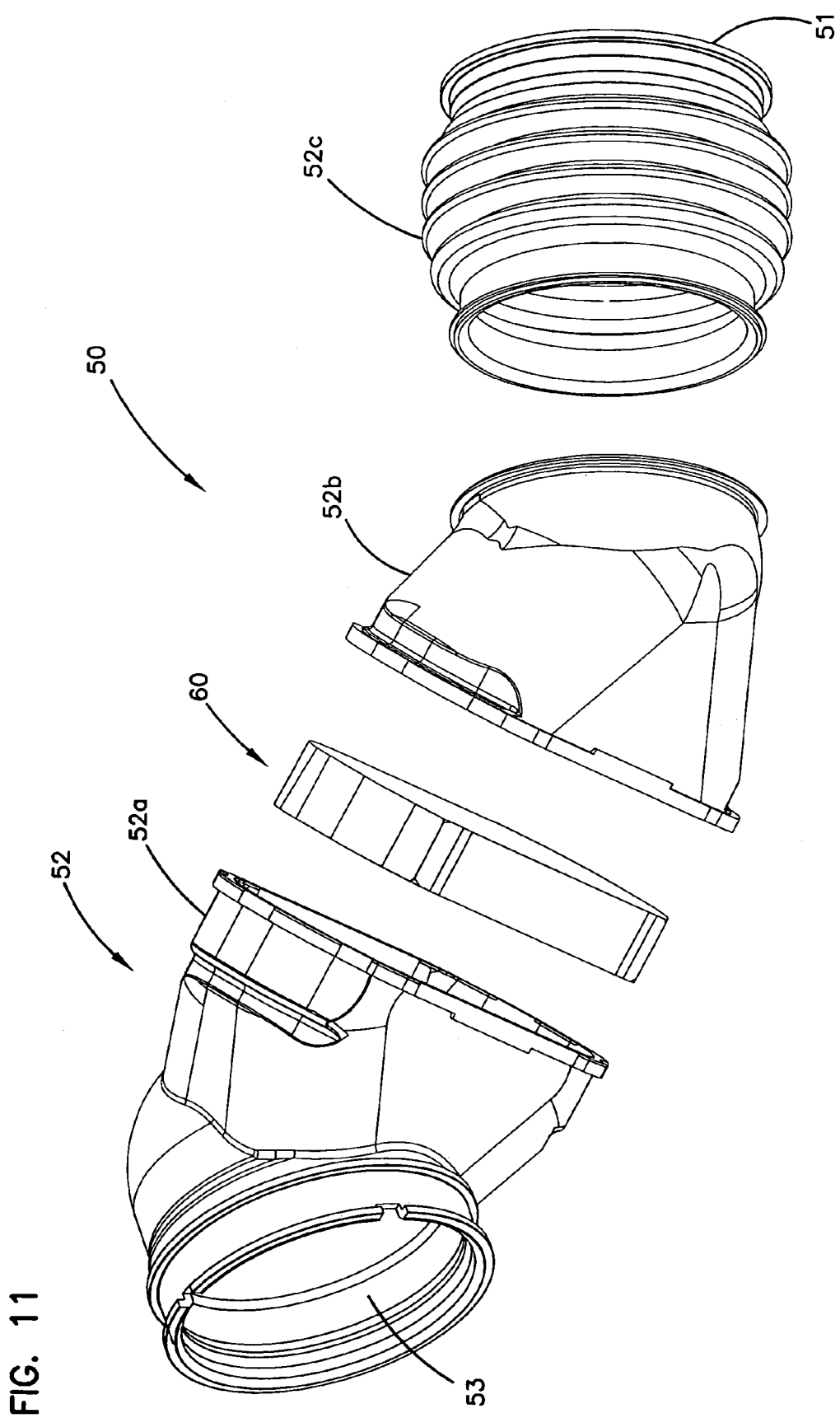
FIG. 11 is an exploded perspective view of an air duct having an adsorptive element of the present invention incorporated therein.

In FIG. 11, an assembly 50 is illustrated having an adsorptive element 60 retained within the air flow path of duct 52. Adsorptive element 60 is configured to fit with and be held by duct 52, either within duct portion 52a, duct portion 52b, or even duct portion 52c. In some designs, a separate frame can be used to retain element 60. Element 60 may be permanently affixed within duct 52, or may be removable therefrom, for example, at the separation point of duct portion 52a and duct portion 52b. Air enters duct 52 via inlet 51 at duct portion 52c, passes through duct portion 52b, adsorptive element 60, duct portion 52a, and then exits duct 52 via outlet 53. In this and in preferred embodiments, all air passing through duct 52 passes through adsorption element 60.

An assembly such as illustrated in FIG. 11 can be used in an automobile, any other type of vehicle (such as a snowmobile, tractor, motorcycle, etc.), or any other engine or power generating equipment that uses an intake air source for the combustion process. Element 10, 60 could work with combustion process fueled by gasoline, diesel, methanol, ethanol, propane, natural gas, or the like.

In one particular embodiment, adsorptive element 10, 60 is permanently positioned in a duct providing intake air to the combustion process of a gasoline fueled engine. By use of the term "permanently positioned", it is meant that element 10, 60 cannot be removed from the duct without destroying (e.g., breaking) the integrity of the duct. Element 10, 60, after engine shut-off, inhibits the release of uncombusted gasoline vapors from the engine back to the atmosphere. When the engine is restarted, the incoming flow of fresh air may release the vapors adsorbed on element 10, 60 and return the vapors for combustion.

During the time when the engine is not operating, the amount of gasoline vapors passing through element 10, 60 is minimal; that is, element 10, 60 inhibits the passage of vapors therethrough by adsorbing the organics and other materials onto the adsorptive coating. In one preferred design, element 10, 60 allows no more than 82 mg of gasoline vapor per 24 hours through passages 16, when exposed to 1 gram of gasoline over a total of 73 hours. In a more preferred design, element 10, 60 allows no more than 82 mg of gasoline vapor per 24 hours therethrough, when exposed to 1.5 grams of gasoline over a total of 73 hours.

A suitable size for element 10, 60 for permanently mounting in a gasoline powered automobile is one that has a face area (e.g., area of first face 17) of about 12 to 24 in$^2$ (about 77.5 to 155 cm$^2$). One particular element 10, 60 has a generally rectangular shape, approximately 3 by 6 inches (about 8 by 15 cm), with rounded corners defined by a 1 inch (about 2.5 cm) radius, and having a thickness of about 1 inch (about 2.5 cm).

It is understood that adsorbent element 10 can be shaped and sized to be used with any suitable frame, ductwork, or tubular member. For example, adsorptive element 10 can be shaped and sized as a panel, for example, about 24 inches by 24 inches (about 61 cm by 61 cm) square, to fill a duct, such as an air duct, or other air handling equipment. Such a large adsorbent element 10 can be used for filtering air entering a large enclosed environment, such as a semiconductor processing facility, commercial office, personal residence, or an airplane cabin. Element 10 could be incorporated with a building's heating and air conditioning system. Proper and efficient operation of a fuel cell also desires incoming air (oxidant) that is free of unacceptable chemical contaminants. Adsorbent element 10 can also be used for filtering air exiting from an enclosed environment and being discharged into the atmosphere.

The shape and size of adsorptive element 10 should be such that will remove the maximum desired amount of contaminants from the gas or air passing therethrough, based on the residence time of the gas in element 10. For example, preferably at least 90%, more preferably at least 95% of contaminants are removed. In some designs, as much as 98%, or more, of the contaminant is removed. It is understood that the desired amount on contaminants to be removed will differ depending on the application and the amount and type of contaminant. As an example, for a semiconductor processing facility, the residence time of the incoming air in element 10 is usually about 0.06 to 0.36 seconds, which can be accomplished with an absorptive element having a thickness of about 3 to 6 inches (about 7.6 to 15 cm).

The adsorptive element can have any suitable cross-sectional shape, such as rectangular, square, circular, oval, etc. The largest dimension of the cross-sectional shape is generally at least 1 inch (about 2.54 cm), usually at least 2 inches (about 5 cm). The adsorptive element can have any suitable thickness. Due to coating or other manufacturing constraints, it may be desirable to axially stack multiple elements to form a thicker element. For example, three 1 inch (2.54 cm) thick elements can be stacked, with the passages aligned, to form a 3 inch (about 7.6 cm) thick element. It is not necessary that the adsorptive element has a planar or flat shape; the element could, for example, have an irregular thickness, or could have a constant thickness but an irregular or regular, non-planar surface.

Generally, passages 16 through element 10, from first face 17 to second face 19, are relatively straight and have no obvious curves or bends. Thus, air or other fluid passing through element 10 travels in a generally straight line. Element 10 is suitable as an air flow straightener and can be used in conjunction with an air mass flow sensor.

Adsorptive element 10 may provide sound attenuation of any noise, such as air flow noise, or noise from equipment, such as a compressor, that is located in fluid flow relation with adsorptive element 10. The frequency and levels of sound attenuation will largely depend on the dimensions of cells 14 and passages 16.

Other Features

When an adsorptive element 10, made by any process described herein, is positioned within a system, a pre-filter, a post-filter, or both may be used in conjunction with adsorptive element 10. A pre-filter is positioned upstream of element 10 and removes airborne particles prior to engaging element 10 and adsorptive media 22. A post-filter is positioned downstream of element 10 and removes any residual particles from element 10 or adsorptive coating 20 before the air is released. These filters are generally electrostatic type filters or other filters and are placed against or in close proximity to first face 17 and second face 19, respectively, of adsorptive element 10.

Also positioned downstream of adsorption element 10 can be an indicator or indicating system to monitor the amount, if any, of contaminant that is passing through adsorption element 10 without being adsorbed. Such indicators are well known.

In some systems, it may be desired that contaminants adsorbed by element 10 are released or desorbed at a desired time. For example, application of heat, current, or voltage to element 10 may release adsorbed contaminants. As another example, application of a specific fluid flow rate through element 10 may release contaminants.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed:

1. A method of removing a contaminant from a gas in an airplane cabin, the method comprising:
    (a) installing a contaminant removal article in a pathway of the gas, the article comprising a body having a thickness of at least 1 cm, the body comprising a plurality of passages extending through the body in a side-by-side array, the passages having a cross-sectional width of no more than about 5 mm, the passages having an interior surface and a coating substantially covering the interior surface, the coating comprising a polymeric binder and an adsorptive particulate, the coating having a thickness of no more than 0.5 mm, and the article having only incidental catalytic properties;
(b) contacting the gas with the article, the gas having contaminant present at a level of 50 ppm-volume to 2 ppb-volume; and
(c) removing at least 90% of the contaminant from the gas with a pressure drop of no greater than 1 inch water at an airflow filter face velocity of 0.5 m/s.

2. The method according to claim 1, wherein the step of removing comprises:
(a) removing at least 95% of the contaminant from the gas with a pressure drop of no greater than 1 inch water at an airflow filter face velocity of 0.5 m/s.

3. The method according to claim 1, wherein the step of removing comprises:
(a) removing at least 98% of the contaminant from to gas with a pressure drop of no greater than 1 inch water at an airflow filter face velocity of 0.5 m/s.

4. The method according to claim 1, wherein the step of removing comprises:
(a) removing at least 90% of the contaminant from the gas wit a pressure drop of no greater than 0.5 inch water at an airflow filter face velocity of 0.5 m/s.

5. The method according to claim 1, wherein the step of removing comprises:
(a) removing at least 90% of the contaminant from the gas with a pressure drop of no greater than 0.1 inch water at an airflow filter face velocity of 0.5 m/s.

6. The method according to claim 1, wherein the step of contacting a gas with the article comprises:
(a) contacting the gas with the article, the gas having VOCs present at a level of 50 ppm-volume to 2 ppb-volume.

7. An apparatus for removing a contaminant from an atmosphere in an airplane cabin, the apparatus comprising:
(a) an adsorptive element comprising a body having a thickness of at least 1 cm and comprising a plurality of passages extending therethrough in a side-by-side array, the passages having a cross-sectional width no greater than about 5 mm, the element comprising a coating less than about 0.5 mm thick substantially covering the passages, the coating comprising a polymeric binder and an adsorptive particulate and having only incidental catalytic activity; and
(b) a housing having an inlet, an outlet, a receiving volume for the adsorptive element each of the inlet and outlet in air flow communication with the passages of the adsorptive element.

8. The apparatus according to claim 7 further comprising a second adsorptive element and a third adsorptive element both comprising a body having a thickness of at least 1 cm and comprising a plurality of passages extending therethrough in a side-by-side array, the passages having a cross-sectional width no greater than about 5 mm, the second and third elements comprising a coating less than about 0.5 mm thick substantially covering the passages, the coating comprising a polymeric binder and an adsorptive particulate and having only incidental catalytic activity.

9. The apparatus according to claim 7, wherein the adsorptive element is configured to remove VOCs from the atmosphere.

10. The apparatus according to claim 7, wherein the passages of the adsorptive element have a cross-sectional area of 1.5 $mm^2$ to 30 $mm^2$.

11. The apparatus according to claim 7, wherein the body of the adsorptive element has a thickness of 2 cm to 10 cm.

12. A system for removing a contaminant from a gas stream for an airplane cabin, the system comprising.
(a) an adsorptive article comprising:
(i) a body having a thickness of at least 1 cm and having a plurality of passages extending along the thickness, the passages having an interior surface and a cross-sectional width of no more than 5 mm; the passages defining an inlet of the article and an outlet; and
(ii) a coating present on the interior surface of the passages, the coating comprising a polymeric binder and an adsorbent particulate and having a thickness less than 0.5 mm, the coating being substantially free of catalytic activity; and
(b) a particulate filter in air flow communication with the inlet of the adsorptive article.

13. The system according to claim 12, wherein the adsorptive article is configured to remove VOCs from the gas stream.

14. The system according to claim 12, wherein the passages of the body have a cross-sectional area of 1.5 $mm^2$ to 30 $mm^2$.

15. The system according to claim 12, wherein the body has a thickness of 2 cm to 10 cm.

16. The system according to claim 12 comprising at least three adsorptive articles as defined by claim 12.

* * * * *

UNITED STATES PATENT AND TRADEMARK OFFICE
CERTIFICATE OF CORRECTION

PATENT NO. : 7,022,158 B2 Page 1 of 1
APPLICATION NO. : 10/705753
DATED : April 4, 2006
INVENTOR(S) : Seguin et al.

It is certified that error appears in the above-identified patent and that said Letters Patent is hereby corrected as shown below:

Col. 15, line 16, claim 3: "from to gas" should read --from the gas--

Col. 15, line 22, claim 4: "wit a pressure" should read --with a pressure--

Signed and Sealed this

First Day of August, 2006

JON W. DUDAS
*Director of the United States Patent and Trademark Office*